MATRIX CROSS-POINT SCANNING SYSTEM

Filed Sept. 29, 1960 5 Sheets-Sheet 1

INVENTOR

BY

AGENT

INVENTOR
Simon Duinker
Gesinus Diemer
Edward F. de Haan
Johannes G. van Santen
BY
Frank R. Jefferies
AGENT

MATRIX CROSS-POINT SCANNING SYSTEM

Filed Sept. 29, 1960

INVENTOR
Simon Duinker
Jesinus Dienne
Edward F. de Haan
Johannes G. van Santen
BY
Frank R. Jeifari
AGENT INVENTOR
Simon Duinker
Gesinus Diemer
Edward F. de Haan
Johannes G. van Santen
BY
Frank R. Jifari
AGENT

INVENTOR
BY
AGENT

United States Patent Office 3,142,819
Patented July 28, 1964

3,142,819

MATRIX CROSS-POINT SCANNING SYSTEM

Simon Duinker, Gesinus Diemer, Edward Fokko de Haan, and Johannes Gerrit van Santen, all of Eindhoven, Netherlands, assignors to North American Philips Company, Inc., New York, N.Y., a corporation of Delaware Filed Sept. 29, 1960, Ser. No. 59,356
Claims priority, application Netherlands Oct. 2, 1959
10 Claims. (Cl. 340—166)

The invention relates to a circuit arrangement for controlling a matrix cross-point scanning system consisting of at least two inter-crossing groups of conductors. In this system, switching means are provided to switch the conductors of at least one group in cyclic order of succession to a potential deviating from that of the non-switched conductors of the said group and to subsequently return the switched conductors to the potential of the non-switched conductors.

Suitable arrangements to this end are described in the U.S. Patent No. 2,925,525. In this patent the conductors of the matrix cross-point scanning system are controlled by means of two photo-conductive strips which are optically scanned by cathode-ray tubes. The use of these additional cathode-ray tubes, however, is costly. It is, moreover, desirable to provide a flat panel, but this is not possible if one or two cathode-ray tubes have to be added to the cross-point scanning system. As a matter of fact, the cathode-ray tubes with the photo-conductive strips could be arranged in the associated elements furnishing the various control-voltages, but in this case the tappings of the strips are to be connected by way of one or more cables to the conductors of the cross-point scanning system. With a television reproducing panel suitable for the display of an image built in accordance with the 625 line system, this means that at least 625 conductors must be arranged between one of the two strips and one group of conductors. It will be obvious that cables having such a large number of conductors are unsuitable for practical purposes.

The circuit arrangement according to the invention obviates these disadvantages and it is characterized in that the switching means consist of a number of bistable trigger circuits, preferably energized from a separate source. The number of trigger circuits is higher than or equal to the number of conductors of the group to be switched and of control devices connected to the former and energized from at least one further common source. Each of the trigger circuits is provided with at least two connecting terminals. Between these terminals a low impedance prevails in one stable state and a high impedance prevails in the other stable state. These impedance conditions are brought about by pulses emanating from a control-device, which provides these pulses only when the associated trigger circuit, to one terminal of which it is connected, is in a stable state differing from that of the other circuits, while each of the trigger circuits is connected by way of the terminal to which the associated control-device is connected, by way of a resistor and a common direct-voltage source, to the other terminal of the same trigger circuit while a conductor of the group to be switched is connected to the first-mentioned terminal of the trigger circuit concerned.

In order to adapt the solution provided by the invention to the use with a television display panel, a further embodiment of the arrangement according to the invention is characterized in that each trigger circuit consists of a first photo-resistor, for example of cadmium sulphide (CdS), activated by $2 \cdot 10^{-4}$ gallium (Ga) and $1.9 \cdot 10^{-4}$ copper (Cu) atoms per molecule CdS, connected in series with an electro-luminescent element, for example, of zinc sulphide (ZnS), activated with $10^{-3}$ copper (Cu) and $9 \cdot 10^{-4}$ aluminium (Al) atoms per molecule ZnS, while in parallel with the electro-luminescent element is connected a second photo-resistor, and of a third photo-resistor which is electrically separated from the said series-parallel combination and which is connected between the two connecting terminals of the trigger circuit, while each control-device consists of the parallel combination of, for example, a carbon resistor and a further electro-luminescent element, the radiation produced by the electro-luminescent element of the series-parallel combination being directed towards the first and the third photo-resistor and that of the electro-luminescent element of the control-device being directed either towards the second photo-resistor of the associated trigger circuit and to the first photo-resistor and of one of the other trigger circuits, or towards the first photo-resistor of the associated trigger circuit and the second photo-resistor of one of the further trigger circuits, while the common energizing source is connected to the terminals of all series-parallel combinations.

A few potential embodiments of circuit arrangements according to the invention will now be described by way of example with reference to the accompanying drawings in which.

Figure 1:
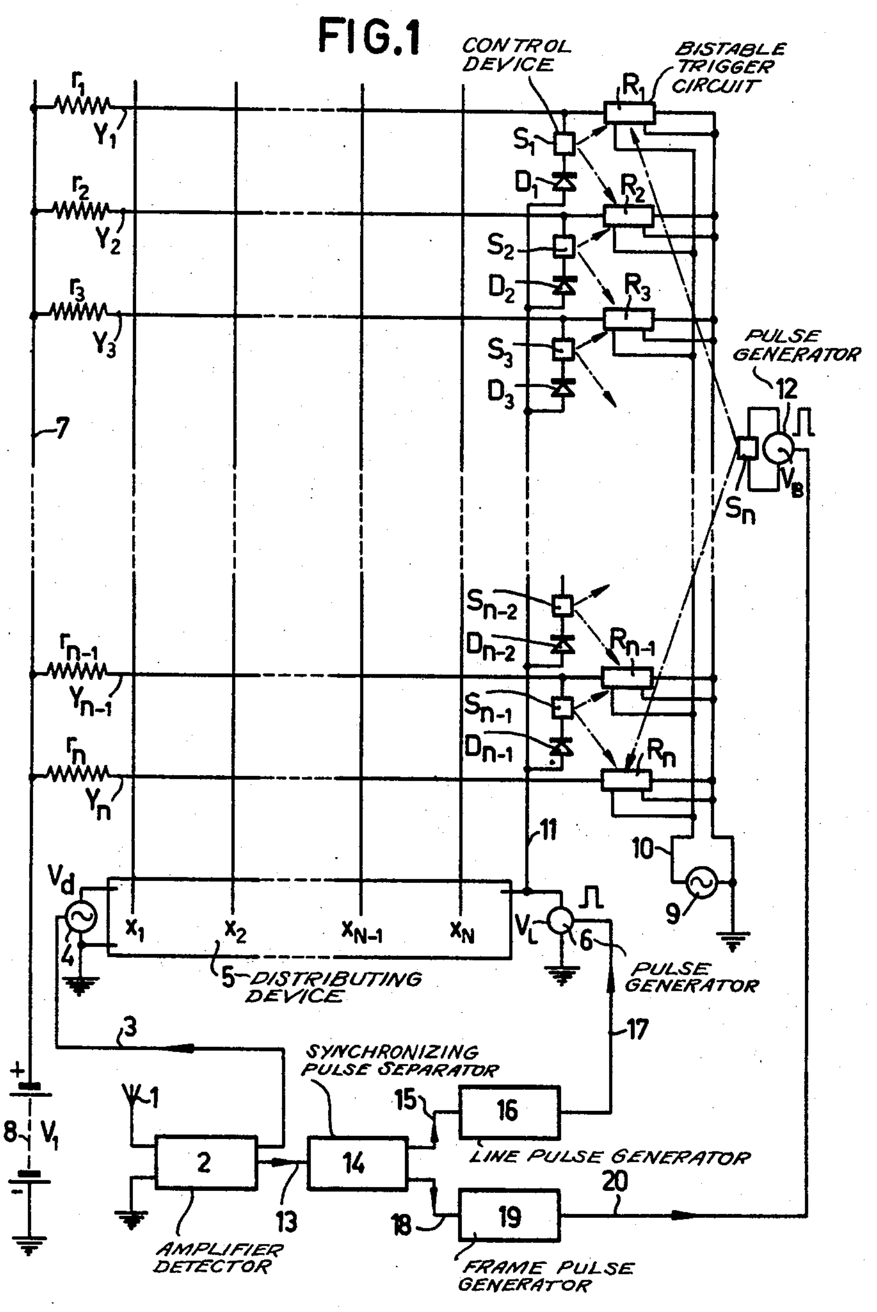
FIG. 1 shows a general embodiment of a first control-method.

FIG. 1 shows only the $x$- and $y$-conductors of a matrix cross-point scanning system. For the sake of simplicity the circuit elements arranged at the crossings of these conductors are omitted. If the scanning system constitutes a display panel, two layers, one of material having electro-luminescent properties and one of material being unilaterally conductive are provided between the $x$- and $y$-conductors.

The video information is supplied via the $x$-conductors. To this end the television signal received by the antenna 1 is amplified and detected in amplifier-detector 2, after which it is supplied via the conductor 3 to the generator 4, which supplies a video signal $V_d$ to the distributing device 5, for example, of the type disclosed in U.S. Patent No. 2,967,265. This distributing device 5 converts the signal $V_d$ coming in as a function of time into a signal as a function of position, so that after each line period the desired information for one line is distributed along the tappings coupled with the $x$-conductors. At this instant the generator 6 supplies a pulse $V_L$, which releases the voltage across the $x$-conductors. Due to the storage elements provided in the device 5, these voltages are maintained for some time. At the same time the $y$-conductor, corresponding to that line of the image to be reproduced for which the information of the $x$-conductors is intended, is brought to such a potential so that an adequately high potential difference is produced between the $x$-conductors and the desired $y$-conductor.

In order to achieve this the $y$-conductors are connected by way of resistors $r_1$ to $r_n$ to the conductor 7, which is connected to the positive terminal of the voltage source 8. The negative terminal of source 8 is connected to ground and this source supplies a voltage of $V_1$ volts. Moreover, these $y$-conductors are grounded by way of circuits $R_1$ to $R_n$.

Each circuit R, constructed as a quadripole, is to be considered as a bistable trigger circuit. A first switching pulse supplied thereto moves this circuit into one stable state, in which the impedance between the terminals by which the device is connected to a $y$-conductor and to ground respectively, becomes low. A second switching pulse moves the device into the other stable state, so that the impedance between the said terminals becomes high. The circuits R are energized in common by the source 9. To this end the two further terminals of the circuit R are connected to the source 9 by way of ground and via the conductor 10. When the impedance of a circuit R is high between the first-mentioned terminals, the $y$-conductor connected thereto is at a high potential relative to ground. It is assumed, for example, that this high impedance is equal to $R_h$ ohms and that of the associated resistor $r$ equal to $r$ ohms, then the potential of the $y$-conductor concerned is determined by:

$$V_y=\frac{R_h}{r+R_h}\cdot V_1 \text{ volts}$$

If the impedance of a circuit R is low, for example $R_l$ ohms, the potential at the $y$-conductor concerned is equal to:

$$V_y'=\frac{R_l}{r+R_l}\cdot V_1 \text{ volts}$$

Assuming that $R_h=10^6$ ohms and $R_l=10^2$ ohms and the resistance value of $r=10^4$ ohms; then:

$$V_y=\frac{10^6}{10^4+10^6}\cdot V_1=\frac{100}{101}\cdot V_1 \text{ volts and}$$

$$V_y'=\frac{10^2}{10^4+10^2}\cdot V_1=\frac{1}{101}\cdot V_1 \text{ volts}$$

If $V_1=500$ volts, this means that, if the circuit R is in the high-impedance state, the $y$-conductor concerned assumes a potential which is substantially equal to +500 v., whereas, if the circuit R is in the low-impedance state, this $y$-conductor is at a potential of about +5 v. to earth.

The unilaterally conductive layer is arranged in the cross-bar system so that at each crossing a unilaterally conductive element is formed. The anode of the element is connected to an $x$-conductor and the cathode is connected to a reproducing element formed by the phosphor layer. The unilaterally conductive element is otherwise in contact with the subjacent $y$-conductor. If the positive control-voltages at the $x$-conductors remain below 500 v., but above 5 v., all unilaterally conductive elements of the scanning system are blocked, with the exception of that associated with the $y$-conductor being at a potential of 5 v. The electro-luminescent elements of this $y$-conductor are thus caused to luminesce in accordance with the voltage prevailing at the instant concerned across the $x$-conductors.

The circuits $R_1$ to $R_n$ are controlled by means of control-devices $S_1$ to $S_{n-1}$. They are connected on the one hand to the conductors $y_1$ to $y_{n-1}$ and on the other hand by way of unilaterally conductive elements $D_1$ to $D_{n-1}$ and the conductor 11 to the pulse generator 6. The anodes of the elements D are connected to the conductor 11 and the cathodes to the control-devices S. Only that element D of which the associated $y$-conductor is at a low potential to ground is conductive.

Assume that at a given instant the circuit $R_2$ is in the low-impedance state. The reproducing elements associated with the conductor $y_2$ will thus be caused to luminesce, while of all elements D only the element $D_2$ is conductive. The next-following pulse $V_L$ supplied by the source 6 releases the information voltage for the conductor $y_3$ to the $x$-conductor and produces, in addition, a current passing through the conductive element $D_2$ and the control-device $S_2$. This control-device supplies a pulse, which, as is indicated by the dot-and-dash line, controls both the circuit $R_2$ and the circuit $R_3$. This switching pulse changes the circuit $R_2$ into the high-impedance state and the circuit $R_3$ into the low-impedance state. The conductor $y_2$ thus assumes a potential of about 500 v., so that the associated reproducing elements are extinguished. The conductor $y_3$ assumes a low potential, so that the reproducing elements associated with this conductor will luminesce in accordance with the voltages across the $x$-conductors, which have been released simultaneously by the action of the same pulse $V_L$ on the device 5.

This state is maintained until new information has been distributed along the tappings of the device 5. The subsequent pulse $V_L$ encounters only the diode $D_3$ in the conductive state, so that the current thus produced changes, by way of the control-device $S_3$, the circuit $R_3$ into the high-impedance state and the circuit $R_4$ into the low-impedance state.

Continuing in this way the whole panel is scanned under the control of the pulse source 6 until the lowermost conductor $y_n$ assumes a potential of 5 v. The next-following information for the $x$-conductor is again associated with the conductor $y_1$, so that provision must be made of means which change the conductor $y_n$ again to a high potential and the conductor $y_1$ to a low potential with respect to ground. For this purpose, in principle, a further unilaterally conductive element $D_n$ with a control-device $S_n$ could be provided between the conductor 11 and $y_n$, the switching pulse supplied by $S_n$ having to act upon $R_n$ and $R_1$.

However, since with the present-day television systems separate frame synchronising pulses are transmitted with the incoming television signal, a different solution is indicated. The control-element $S_n$ is connected, in this case, to a generator 12, which supplies the frame-synchronising pulses $V_B$. After the pulse $V_L$, which causes the conductor $y_n$ to assume a low potential, a pulse $V_L$ and a pulse $V_B$ occur simultaneously, the pulse $V_L$ releasing the voltage across the $x$-conductors and the pulse $V_B$ controlling the device $S_n$. The device $S_n$ supplies switching pulses both to the circuit $R_n$ and to the circuit $R_1$ to provide the desired impedance states thereof. Thus the element $D_1$ is conductive, so that a next-following pulse $V_L$ controls the device $S_1$, with the result that the conductor $y_1$ assumes a high potential and the conductor $y_2$ assumes a low potential, the state first described being thus obtained again.

In order to ensure a synchronous operation the pulses $V_L$ are derived from the line-synchronising pulses and the pulses $V_B$ from the frame-synchronising pulses. To this end the detected video signal, still containing the frame- and line-synchronising pulses, is fed via the conductor 13 to the synchronising-pulse separator 14. The separated line-synchronising pulses are fed via the conductor 15 to the generator 16. This generator may be a simple amplifier, but it may also comprise an oscillator, with a phase discriminator associated herewith to cause this scillator to operate in synchronism with the line-synchronising pulses. The amplified or the produced pulses are fed via the conductor 17 to the generator 6, which supplies the described pulses $V_L$. The generator 6 may be a simple amplifier. The use of an oscillator in the device 16 has the advantage that, when a few line-synchronising pulses are lacking, the leap from one $y$-conductor to the other does not cease.

The frame-synchronising pulses separated out in the device 14 are fed via the conductor 18 to the generator 19. This generator may be a simple amplifier or it may comprise a synchronized oscillator. The frame-synchronising pulses obtained from the device are fed via the conductor 20 to the generator 12. This generator may be a simple amplifier.

There are two advantages in the use of a separate generator 12.

Firstly there is always a starting pulse available, which, upon switching on, ensures the start of the scanning. Secondly, if for some reason or other one or more pulses $V_L$ are missing or if the oscillator included in the device 16 has temporarily gone out of synchronism, the start of a frame scanning is each time readjusted by the pulse $V_B$.

Figure 2:
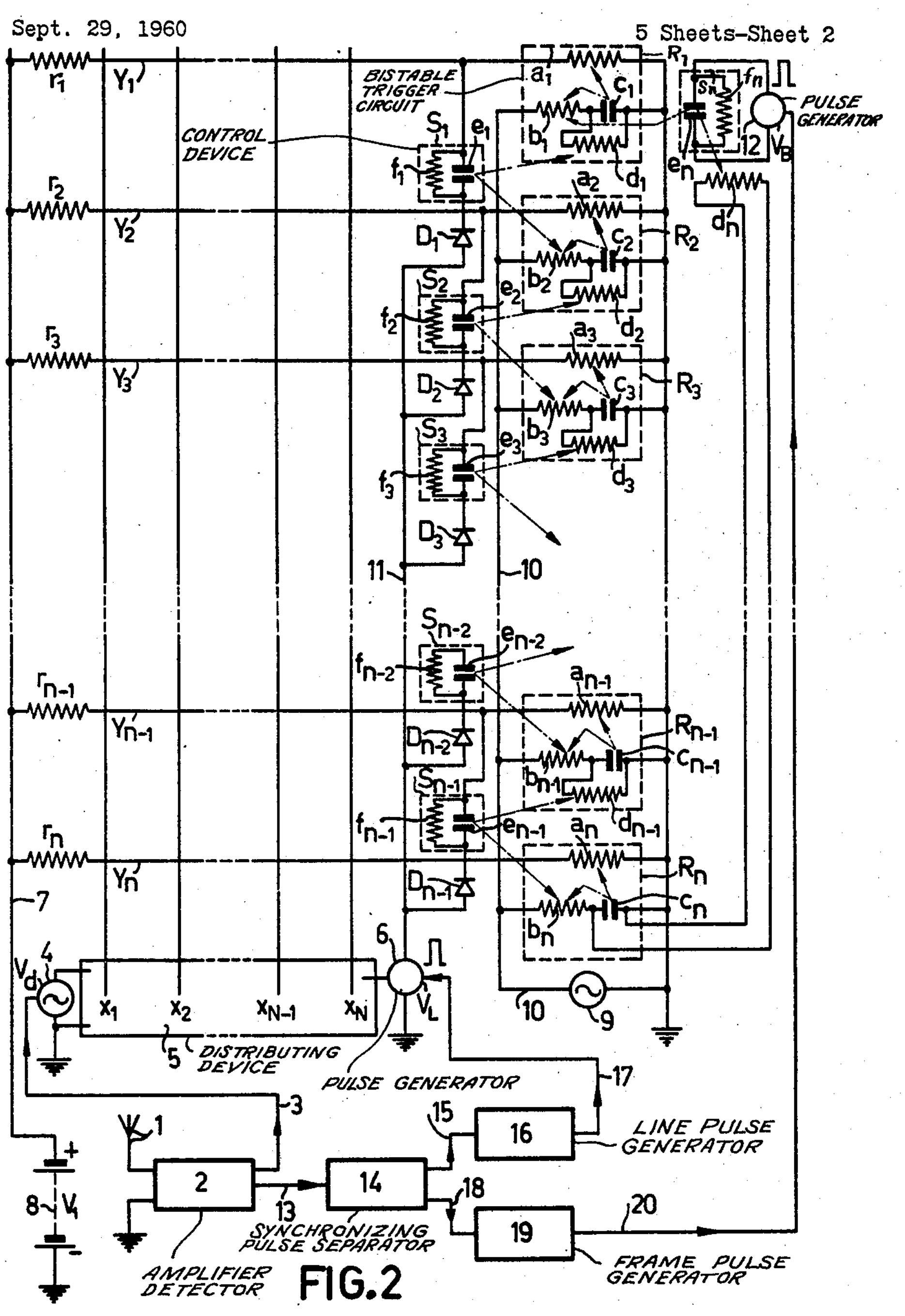
FIG. 2 shows a detailed circuit diagram of the embodiment shown in FIG. 1.

FIG. 2 shows a detailed embodiment of the devices R and S.

Each circuit R comprises:

(1) A photo-conductive resistor *a*, which is connected between a *y*-conductor and earth;
(2) A photo-conductive resistor *b*, which is connected in series with an electro-luminescent element *c*; this series combination is arranged between the conductor 10 and earth;
(3) A photo-conductive resistor *d*, which is connected in parallel with the electro-luminescent element *c*.

The resistors *a* and *b* are arranged so that they are both struck by the radiation from the element *c*, when the latter luminesce.

A device S comprises:

(1) An electro-luminescent element *e*,
(2) A carbon resistor *f*, which is connected in parallel with the electro-luminescent element *e*.

The resistor *f* is required to ensure that the charge supplied via the unilaterally conductive element D to the element *e*, formed by a capacitor, can leak away. Leaking away should take place so that the element *e* has sufficient time to block the associated circuit R and to start the next-following circuit R by its radiation.

The radiation from an electro-luminescent element *e* is directed to the resistor *d* of the associated device R and to the resistor *b* of the next-following device R.

It should be noted that the electro-luminescent element $e_n$ of the device $S_n$ irradiates the resistor $b_1$ of the circuit $R_1$ and the resistor $d_n$ of the circuit $R_n$. The resistor $d_n$ is arranged, to this end, quite near the control-device $S_n$, as is illustrated in FIG. 2.

The photo-conductive resistors *a*, *b* and *d* may be made from cadmium sulphide (CdS), activated with $2 \cdot 10^{-4}$ gallium (Ga) atoms and $1.9 \cdot 10^{-4}$ copper (Cu) atoms per molecule CdS.

The electro-luminescent elements *c* and *e* may be made from zinc sulphide (ZnS), activated with $10^{-3}$ copper (Cu) and $9 \cdot 10^{-4}$ Al atoms per molecule ZnS.

The trigger circuits operate as follows:

A pulse $V_B$ causes the element $e_n$ to luminesce. This element irradiates the photo-conductive resistors $b_1$ and $d_n$. Owing to this radiation the resistance value of these photo-resistors is materially reduced.

Owing to the reduction of resistance of $b_1$ a large voltage drop occurs across the element $c_1$, so that this element luminesces. Owing to the radiation of the element $c_1$ onto the photo-conductive resistor $b_1$, the resistance value of this resistor remains low and owing to the radiation onto $a_1$, the resistance value of the latter resistor is strongly reduced. The large voltage drop across element $c_1$ is therefore maintained, so that this element continues luminescing and the resistance of $a_1$ remains low. Thus the first stable state is attained. The impedance of the circuit $R_1$ between the terminals by which it is connected to the conductor $y_1$ and to ground, is low so that the conductor $y_1$ is at a low potential to ground.

The subsequent pulse $V_L$ thus finds only the element $D_1$ conductive and causes the element $e_1$ to luminesce. The radiation of this element strikes the photo-resistor $d_1$ and $b_2$. Thus the element $c_1$ extinguishes and the element $c_2$ luminesces. The radiation on the resistors $b_1$ and $a_1$ is thus suppressed and the conductor $y_1$ assumes a high potential to earth, while the element $c_1$ remains extinguished.

At the same time the radiation on the resistors $a_2$ and $b_2$ starts, so that the conductor $y_2$ assumes a low potential to ground. The next-following pulse $V_L$ ensures that the conductor $y_3$ assumes a low potential and the conductor $y_2$ a high potential. Continuing in this way the conductor $y_n$ will finally assume a low potential, after which the pulse then occurring $V_B$ causes the element $e_n$ to luminesce. The radiation of the element $e_n$ strikes the photo-resistors $b_1$ and $d_n$. The effect of the radiation on $b_1$ is similar to that described above and the radiation on $d_n$ causes the element $c_n$ to become extinguished and the conductor $y_n$ to assume a high potential to earth.

The circuit arrangements described with reference to FIGS. 1 and 2 always transfer one *y*-conductor from a high potential to a low potential and at the same time the subsequent *y*-conductor from a low potential to a high potential. However, if one *y*-conductor is to be brought from a high potential to a low potential and subsequently again to a high potential, without a variation in potential of the next-following *y*-conductor, the arrangement shown in FIG. 3 may be employed.

As is shown in this figure, apart from the trigger circuits $R_1$ to $R_n$, provision is made of trigger circuits $Q_1$ to $Q_{n-1}$. With the Q-circuits are associated series resistors $q_1$ to $q_{n-1}$, control-devices $T_1$ to $T_{n-1}$ and unilaterally conductive elements $G_1$ to $G_{n-1}$.

Q- and R-circuits are similar to each other, likewise the S- and the T-devices. However, with the Q-circuits no *y*-conductors are associated. An S-device supplies a switching-out pulse to an R-circuit and a switching-on pulse to a Q-circuit, whereas a T-device supplies a switching-out pulse to a Q-circuit and a switching-on pulse to an R-circuit. The elements D with the associated control-devices S are controlled by switching pulses $V_p$, which are obtained via the conductor 25 from the generator 26. From the source 6, via the conductor 27, the pulses $V_L$ are supplied to the unilaterally conductive elements G with the associated control-devices T. The pulses $V_p$ are delayed in a delay circuit 28 with respect to the pulses $V_L$. This delay circuit may comprise, for example, an integrating network to which the pulses $V_L$ are fed, and a limiting circuit, which limits the integrated pulses. The time constant of the integrating network and the adjustment of the limiting circuit then determine the desired time lag of $V_p$ with respect to $V_L$. This time lag is a measure for the time during which a *y*-conductor is maintained at a low potential. The control of the scanning system is as follows.

The frame pulse $V_B$, which coincides with a line pulse $V_L$ conveys a current through the control-device $T_n$. This device supplies a switching pulse to the circuit $R_1$, which is brought into the low-impedance state. Thus the conductor $y_1$ assumes a low potential to ground and the element $D_1$ is conductive. At the same time the pulses $V_L$ release the voltages at the *x*-conductors so that the reproducing elements associated with the conductor $y_1$ are caused to luminesce. At the occurrence of the delayed pulse $V_p$, current is passed only through the device $S_1$. This device supplies a switching-out pulse to the circuit $R_1$ to change it to a high-impedance state, and a switching-on pulse to circuit $Q_1$ to change this circuit to a low-impedance state. The conductor $y_1$ thus assumes a high potential again and the unilaterally conductive element $G_1$ is conductive. A next-following pulse $V_L$ releases information of the *x*-conductors for the elements associated with the conductor $y_2$ and at the same time conveys a current through the control-device $T_1$. This device supplies switching pulses to the circuits $Q_1$ and $R_2$, so that the conductor $y_2$ assumes a low potential and the element $D_2$ is conductive. Continuing in this way, the *y*-conductors sequentially assume, for a short time, a low potential, so that the information of the *x*-conductors, for this short time, can be transferred to the elements on the crossings between the *x*-conductors and the *y*-conductor concerned. This is particularly important, if no reproducing elements are provided at the said crossings, but if storage elements are arranged there. The storing effect of the device 5 need then be only transient (preferably the time for which the voltages are maintained across the *x*-conductors at their full value is to be equal to the time for which a *y*-conductor is at a low potential) and the information of the crossings is transferred as soon as possible to the storage elements provided there. After the *y*-conductor has reassumed a high potential, the information stored in the storage elements at the crossings is employed to control continuously the reproducing elements connected therewith. To this end a separate energizing source (not shown) is provided. The voltage or current supplied by this source energizes the reproducing elements under the control of the storage elements. It is thus ensured that the reproducing elements luminesce substantially continuously with an intensity which varies with the information supplied to the storage elements. The luminescence of the reproducing elements associated with one $y$-conductor is interrupted only for the time in which this $y$-conductor assumes a low potential and in which, moreover, new information is supplied to the associated storage elements.

The last conductor $y_n$ again assumes a high potential by the pulse $V_p$, after which the subsequent pulse $V_B$ again initiates the whole cycle.

Also in this case a circuit $Q_n$ could be added, which is changed into the low-impedance state by a switching pulse of the control-device $S_n$. The associated control-device $T_n$ ($T_n$ is now added to $Q_n$ and the generator 12 may be dispensed with) with the unilaterally conductive element $G_n$ can again ensure that the circuit $Q_n$ arrives into the high-impedance state and the circuit $R_1$ into the low-impedance state, when a pulse $V_L$ releases the voltage of the $x$-conductors for the conductor $y_1$. This involves the difficulty of the system getting out of synchronism and starting difficulties. Such a scanning system may be employed in a so-called closed television system (closed circuit), in which no risk of getting out of synchronism or of lacking line pulses is involved. The starting difficulty may be overcome by supplying a short starting pulse when the apparatus is switched on, which starting pulse moves $R_1$ into the low-impedance state.

Figure 3:
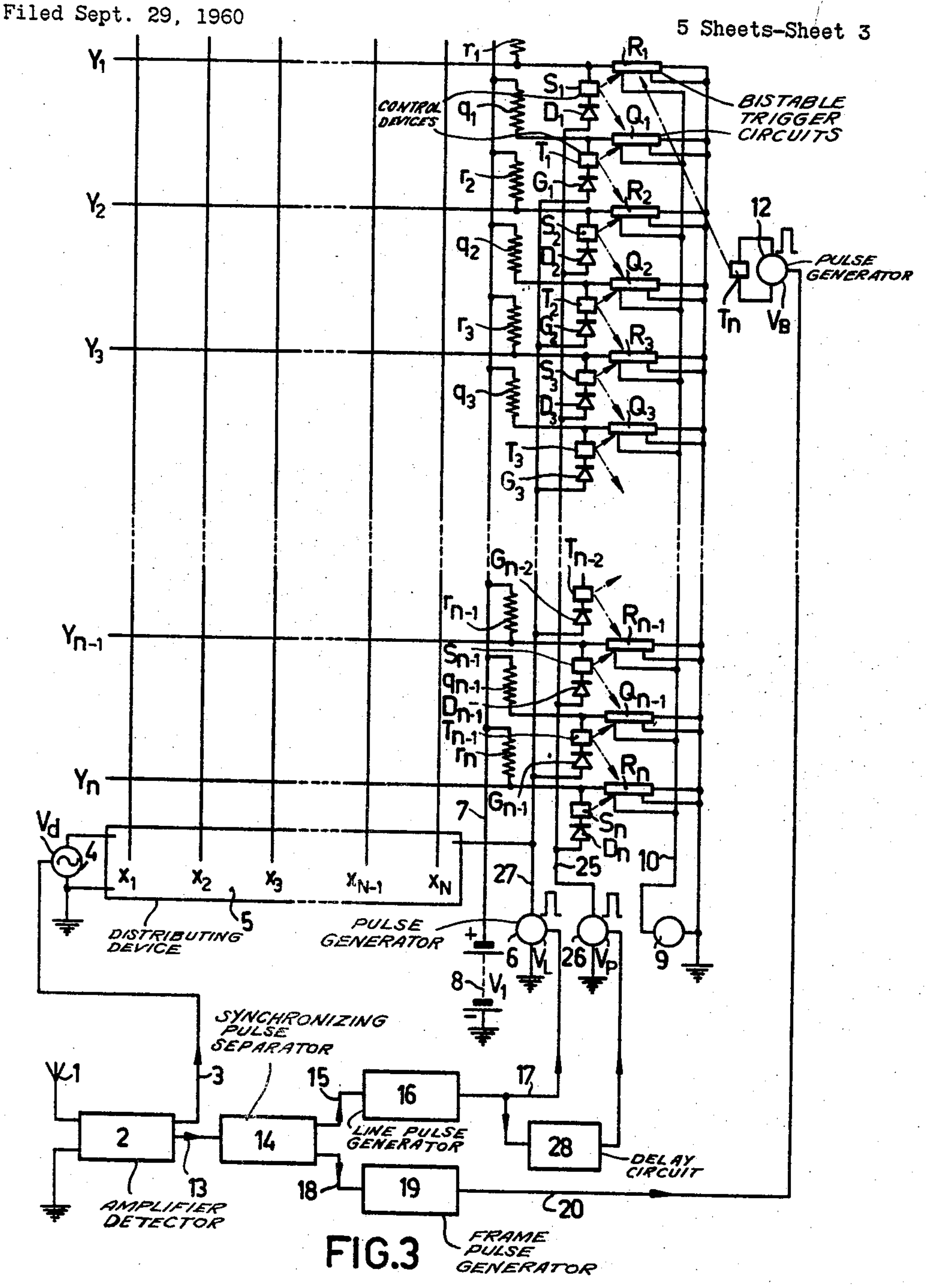
FIG. 3 shows an extension of the embodiment of FIG. 1.

The control-method illustrated in FIGS. 1 and 3 may be successfully used, when a television signal built up in accordance with the interlaced scanning system is received.

In this case the circuits R are connected to the odd-numbered $y$-conductors ($y_1$, $y_3$, $y_5$ . . . $y_{n-1}$) and the circuits Q to the even-numbered $y$-conductors ($y_2$, $y_4$, $y_6$ . . . $y_n$). It should be noted that in this case the circuits R have odd numbers ($R_1$, $R_3$, $R_5$ . . . $R_{n-1}$), as well as the associated unilaterally conductive elements D ($D_1$, $D_3$, $D_5$ . . . $D_{n-3}$) and the control-devices S ($S_1$, $S_3$, $S_5$ . . . $S_{n-1}$). The device $S_{n-1}$ is energized by a generator 12', to which the frame synchronising pulses for the even-numbered lines are supplied. The switching pulses emanating from the device $S_{n-1}$ act upon the circuits $Q_2$ and $R_{n-1}$, the first being changed from the high-impedance state into the low-impedance state and the second being moved from the low-impedance state into the high-impedance state. It is understood that the circuits Q are even-numbered ($Q_2$, $Q_4$, $Q_6$ . . . $Q_n$), as well as the unilaterally conductive elements G ($G_2$, $G_4$, $G_6$ . . . $G_{n-2}$) and the control-devices T ($T_2$, $T_4$, $T_6$ . . . $T_n$). The device $T_n$ is energized by a generator 12", to which the raster synchronizing pulses of the odd-numbered raster are supplied. The switching pulses from the device $T_n$ act upon the circuits $R_1$ and $Q_n$, the former being changed from the high-impedance state into the low-impedance state and the latter being changed from the low-impedance state into the high-impedance state. It should furthermore be noted that a device S supplies switching pulses to an associated and to a subsequent R-circuit, which also applies to a device T as far as the change-over of the Q-circuits is concerned. There are no separate pulses $V_p$. The line pulses $V_L$ are supplied both to D and S and to G and T.

After the foregoing description the operation of the assembly will be understood without much further explanation. A synchronizing pulse obtained from 19 is supplied to the generator 12". The device $R_1$ is brought into the low-impedance state and the conductor $y_1$ thus assumes a low potential to earth. The next-following pulse $V_L$ changes $R_1$ into the high-impedance state and $R_3$ into the low-impedance state. This continues until $R_{n-1}$ is in the low-impedance state. The synchronizing pulse then obtained from 19 causes, via the generator 12' and the device $S_{n-1}'$, the circuit $Q_2$ to change to the low-impedance state and the circuit $R_{n-1}$ to change to the high-impedance state. Thus the conductor $y_2$ is at a low potential. Also in this case the pulses $V_L$ provide the change-over of the even-numbered $y$-conductors until the conductor $y_n$ is at a low potential. The raster pulse then occurring changes the circuit $R_1$ into the low-impedance state and the circuit $Q_n$ into the high-impedance state, after which the whole cycle is repeated.

The separation between the even-numbered and the odd-numbered raster pulses may be carried out in known manner by means of gate pulses or by using an oscillator which oscillates with half the raster frequency and which is synchronized by the raster pulses themselves. One obtains, so to say, a division circuit which divides the raster frequency by two. The signal for one generator may be obtained directly from the oscillator and the other may be obtained by way of a network, for example, a transformer producing a phase shift of 180°.

Instead of scanning, with the interlaced scanning method by which first the odd-numbered $y$-conductors and then the even-numbered $y$-conductors are scanned, it is also possible to scan first the conductors $y_1$, $y_5$, $y_9$ . . . $y_{n-3}$, then the conductors $y_2$, $y_6$, $y_{10}$ . . . $y_{n-2}$, subsequently, $y_3$, $y_7$, $y_{11}$ . . . $y_{n-1}$ and finally the conductors $y_4$, $y_8$, $y_{12}$ . . . $y_n$. This may be achieved by causing a control-device associated with a $y$-conductor to act upon the trigger circuit connected to this $y$-conductor and on that associated with a $y$-conductor which has a number lower by 4, for example the control-device associated with $y_1$ must act upon the trigger circuit associated with $y_1$ and upon that associated with $y_5$, and so on.

It is also possible to have the $x$-conductors as well as the $y$-conductors controlled by a device of the kind set forth above. Such a device may then operate as a scanning mechanism both for recording and reproducing purposes. The $x$-conductors are to be controlled in this case in a sense opposite that of the $y$-conductors, since only that $x$-conductor which is to co-operate at a given instant with the $y$-conductor at a low potential, in order to cause the electro-luminescent element provided at the crossing of these two conductors to luminesce, is to be moved to a high potential with respect to the said $y$-conductor. The further $x$-conductors are to be maintained approximately at the same low potential as that of the $y$-conductor of which the potential is reduced. If between the $x$-conductors and the $y$-conductors a unilaterally conductive layer and an electro-luminescent layer are provided to that information transfer takes place from $x$ to $y$ but not from $y$ to $x$-conductors via these layers, only the reproducing element at the desired crossing will respond.

Figure 4:
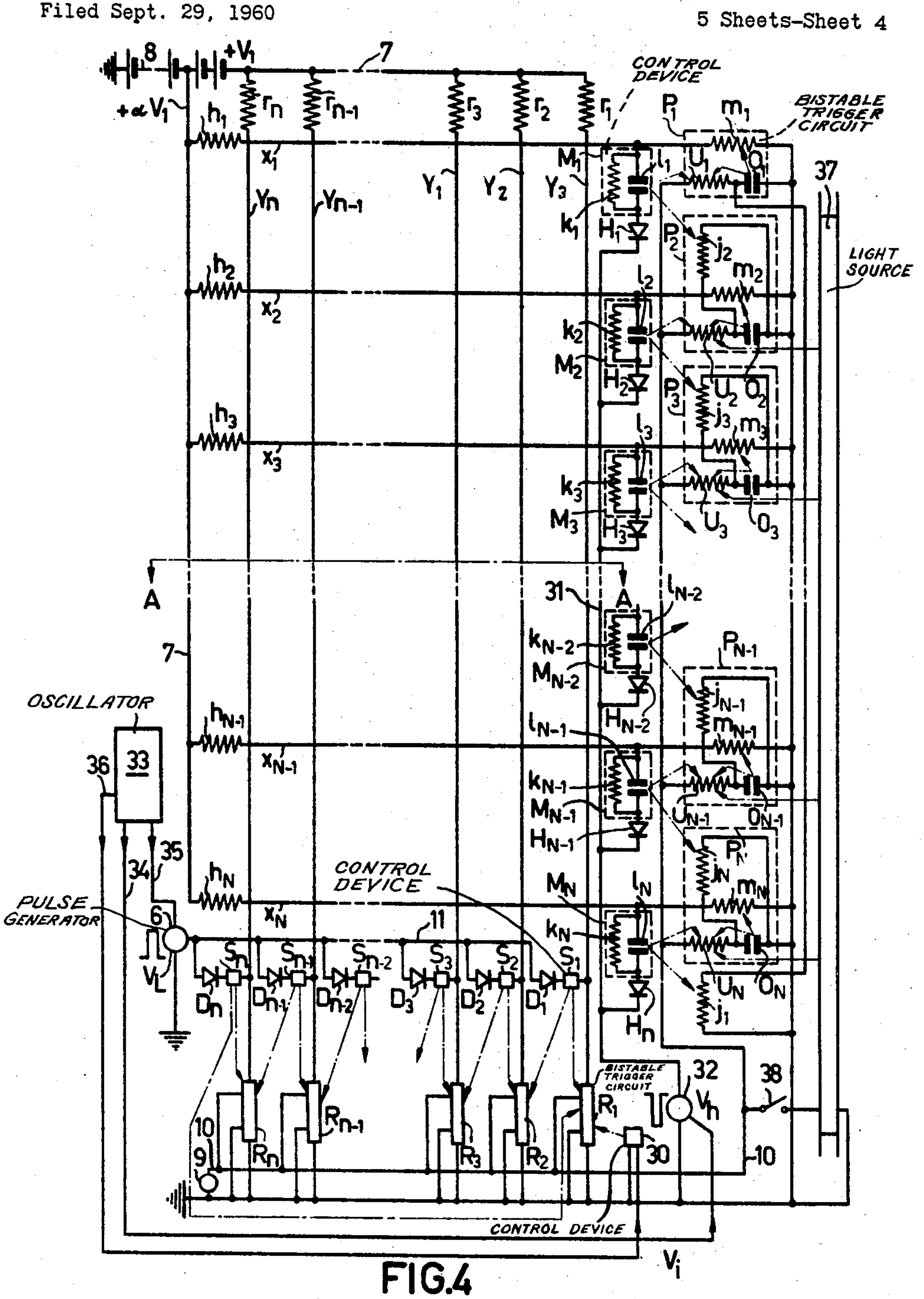
FIG. 4 shows an embodiment of a second control-method, combined with the first control-method

An embodiment of a cross-point scanning system controlled in this manner is illustrated in FIG. 4. In this case the control of the $y$-conductors is substantially similar to that described with reference to FIGS. 1 and 2. Here only a unilaterally conductive element $D_n$ is added, which is connected in series with the control-device $S_n$. The electro-luminescent element $e_n$ of the device $S_n$ illuminates the photo-resistor $b_1$ of the device $R_1$ and the resistor $d_n$ of the device $R_n$, the result being the same as that described with reference to FIG. 2. Starting takes place in that, when switching on the whole system, a control-device 30 obtains, at the correct instant, a starting pulse $V_i$, so that the device $R_1$ is brought into the low-impedance state. The further scanning of the $y$-conductors then takes place by means of the pulses $V_L$. As a matter of fact, also in this case the control-device $S_n$ can be energized from a separate generator 12, as is indicated in FIGS. 1 and 2. In this case the device 30 may be dispensed with.

For scanning the $x$-conductors use is made of an arrangement similar to that used for the $y$-conductors.

To this end the $x$-conductors are connected at one end via resistors $h_1$ to $h_N$ to a tapping of the voltage source 8. From this tapping a positive direct voltage of $\alpha V_1 (\alpha < 1)$ volts may be obtained, so that the potential of the $x$-conductors can never exceed that of the $y$-conductors and luminescence of non-energized crossings is not possible. The remaining ends of the $x$-conductors are connected to ground via circuits $P_1$ to $P_N$. These circuits are similar to the circuits R and Q, but they are controlled in an opposite sense. For this reason the unilaterally conductive elements $H_1$ to $H_N$ are connected with their anodes to the control-devices $M_1$ to $M_N$ and with their cathodes to the conductor 31. An element H is therefore rendered conductive only when an $x$-conductor is at a high potential to ground. The conductor 31 leads to a generator 32, which supplies negative-going pulses $V_h$ to control the devices $M_1$ to $M_N$. The frequency of the pulses $V_h$ is determined by the velocity with which the $x$-conductors are scanned and corresponds to the image dot frequency which varies with the number of images to be scanned per second, the number of lines per image and the number of image dots per line. With a given number of images per second it depends upon the number of $x$- and $y$-conductors. If there are N $x$- and $n$ $y$-conductors and if the number of images per second is $v$, the frequency of the pulses $V_h$ is equal to $Nnv$ c./s. The generator 32 is controlled from a device 33.

If use is made of the arrangement shown in FIG. 4 at the recording end, the device 33 is an oscillator circuit, which produces both the pulses $V_h$ and the pulses $V_L$. These pulses are then supplied via the conductors 34 and 35 respectively to the generators 32 and 6 respectively. Also the starting pulse $V_i$ may be obtained via the conductor 36 from the device 33. The device 33 provides the correct synchronism of the various pulses.

If we are concerned with a reproducing apparatus, two cases may be distinguished:

(1) With a closed circuit (receiver communicates directly with the transmitter through cables) the pulses $V_h$, $V_L$ and $V_i$ may be derived directly from the transmitting device;

(2) With wireless transmission the device 33 may be governed from a device 14, of the kind shown in FIGS. 1, 2 and 3.

The circuits $P_1$ and $P_N$ are driven separately. Upon switching on a light source 37 is made active by closing the switch 38 for a short instant to bring all circuits $P_2$ to $P_N$ into the low-impedance state. The switch 38 is governed to this end from the device 33. The source 37 may be formed by an elongated rod of electro-luminescent material, the electrodes of which are connected to the source 9 via the switch 38, the conductor 10 and ground. The arrows of FIG. 4 indicate that the source 37 illuminates all photo-resistors $u$ of the circuits $P_2$ to $P_N$, so that the electro-luminescent elements $o_2$ to $o_N$ are caused to luminesce. Their radiation is directed to the resistors $u_2$ to $u_N$ and $m_2$ to $m_N$, so that after the source 37 has been switched off, the elements $o_2$ to $o_N$ continue luminescing and the conductors $x_2$ to $x_N$ are at a low potential to ground. Only the circuit $P_1$ has remained in the high-impedance state, so that only the element $H_1$ is conductive. If a pulse $V_h$ is produced, it provides a current through the control-device $M_1$. Thus the electro-lumiescent element $l_1$ of this device is caused to luminesce. It illuminates the photo-resistor $u_1$ of the circuit $P_1$ and the photo-resistor $j_2$ of the circuit $P_2$. Therefore the element $o_1$ is caused to luminesce and the conductor $x_1$ is moved into the low-potential state and held therein. The resistor $j_2$ is connected in parallel with the element $o_2$, so that the latter extinguishes and the conductor $x_2$ arrives at a high potential. Thus the element $H_2$ is rendered conductive and the next-following pulse $V_h$ energizes the device $M_2$, the conductor $x_2$ thus assuming a low potential and the conductor $x_3$ a high potential. Continuing in this way finally the conductor $x_N$ is at a high potential. The pulse $V_h$ subsequently produced causes the element $l_N$ to luminesce. This element illuminates the resistors $u_N$ and $j_1$, so that the conductor $x_N$ again assumes a low potential and $x_1$ a high potential and the initial state is reobtained.

The carbon resistors $k$, connected in parallel with the resistors $l$ serve to adjust the correct time constant of the control-devices M; provisions are to be made in this case that the elements $l$ are capable of luminescing for a sufficient time for the associated element $o$ to luminesce and for the subsequent element to extinguish.

If the potential of the $x$-conductors in their low-potential state is not sufficiently low for the elements H to be blocked, a positive bias voltage may be applied in series with the generator 32. If, for example, $\alpha V_1 = +400$ v., an $x$-conductor in the high-potential state will assume approximately +400 v. and in the low-potential state for example +4 v. If the positive bias voltage is chosen equal to 200 v. and the amplitude of the negative-going pulse equal to −150 v., it is ensured that only the desired element is conductive and is driven by the pulse $V_h$ concerned.

Figure 5:
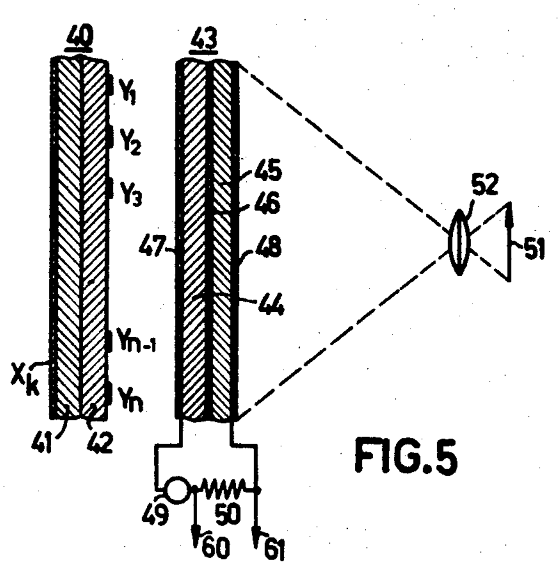
FIGS. 5 and 6 show uses of the embodiment shown in FIG. 4.

By way of example it is shown in FIG. 5 how the circuit arrangement of FIG. 4 may be employed for recording purposes. To this end a sectional view 40 with intermediate layers 41 and 42 is shown in FIG. 5 which sectional view is taken along the line A—A of the cross-bar system of FIG. 4. The layer 41 is made from unilaterally conductive material, the layer 42 is an electro-luminescent layer. At 43 is shown the recording plate. It consists of two layers 44 and 45 both of photoconductive material. These layers are separated by an opaque electrode 46. On either side of the recording panel 43 are provided transparent electrodes 47 and 48, which are connected to each other by way of the energizing source 49 and the load resistor 50. An object 51 is projected via the lens 52 on the layer 45. The impedance of this layer is therefore dot-wise a measure for the intensity of the projected object 51. The impedance of the layer 44, however, is still so high that no current flows through the load resistor 50. The scanning device 40 produces a luminous spot which is produced dot-wise and which reduces dot-wise the impedance of the layer 44. Consequently, a current passes each time through the load resistor 50, when the impedance of the layer 44 is locally reduced; this current depends upon the impedance value of the opposite part of the layer 45. The output signal may be obtained from the terminals 60 and 61.

Similarly, the scanning device may be employed as a so-called (flying spot scanner), the spot emanating from 40 being projected through the slide to be recorded onto a photo-electric cell with its associated multiplier.

Figure 6:
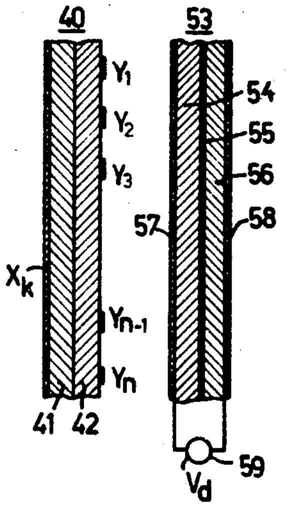

In a similar manner the scanning device 40 may be used in conjunction with an amplificon 53, which is shown only diagrammatically in FIG. 6. It consists of a photoconductive layer 54, an electrode 55, and an electro-luminescent layer 56. The assembly is arranged between electrodes 57 and 58, which are connected to each other via the generator 59. The generator 59 supplies the video signal $V_d$, which may originate from a device 2 of the kind shown in FIGS. 1, 2 and 3. The scanning spot of the device 40 is thus in synchronism with the signal $V_d$ varying as a function of time, if the device 33 of FIG. 4 is governed from the device 14 of the FIGS. 1, 2 and 3. Owing to the local impedance variation of the layer 54 due to the luminous spot from 40 the layer 56 will luminesce locally as a function of the signal $V_d$. It will be obvious that any other known amplificon may be employed instead of that indicated at 53.

It is possible, of course, to use any other bistable trigger circuit for one of the circuits R, Q or P, of which the impedance is high in one stable state and low in the other stable state. Such trigger circuits may be obtained in known manner by means of transistors or tubes. The embodiments shown in FIGS. 2 and 4 of trigger circuits R, Q or P, composed of photo-resistors and electro-luminescent elements and control-devices S, T and M consisting of carbon resistors and electro-luminescent elements with the associated unilaterally conductive elements D, G and H are, however, particularly efficient, when the cross-bar system is to be employed for television purposes. If, for example, 625 $y$-conductors are provided, 625 (FIGS. 1 and 2) or 1250 (FIG. 3) of such trigger circuits, control-devices and unilaterally conductive elements are required. All these elements may be applied to a strip which is slightly shorter than an $x$-conductor ($y$-conductor control) or slightly shorter than a $y$-conductor ($x$-conductor control) by printing or vaporisation techniques. The same applies to the carbon resistor $r$, $q$ and $h$. Also these resistors may be applied to strips by printing techniques.

However, if the scanning system is used for computers, trigger circuits built up from tubes and/or transistors may be employed successfully.

The scanning device described with reference to FIG. 4 is also particularly suitable for telephone vision, in which a more or less static image is transferred by telephone cable from one subscriber to the other and conversely.

It should be noted that the scanning system is not restricted to a matrix cross-point scanning system, in which only two groups of $x$-conductors and $y$-conductors are provided at right angles to each other. For example, the $x$-conductors may be subdivided into three groups $x$, $x'$ and $x''$, three conductors of each group lying side by side. With these three groups of $x$-conductors is associated one group of $y$-conductors, which is governed in a manner as described above. Underneath the conductors of the $x$-group are then located strips of electro-luminescent material capable of luminescing in red, underneath those of the $x'$ group strips capable of luminescing in green and underneath those of the $x''$ group strips capable of luminescing in blue, when the applied voltages exceed the extinction voltages. The group $x$, $x'$ and $x''$ are connected to three converting devices 5, 5' and 5'' respectively (see FIGS. 1, 2 and 3), to which are supplied the red, the green and the blue video signals respectively.

The conductors $x$ and $y$ need furthermore not be normal to each other; all their ends may be located on one side, the conductors being interwoven without establishing a relative electric contact. Between the crossings are again provided the storage elements or reproducing elements with the associated switching elements, moreover, the groups, may be extended for example to three, while by a suitable choice of the cyclic order of succession of the change-over in potential of the conductors each crossing or a combination of crossings may obtain in succession the desired potential difference. Each of the three groups may be governed by a plurality of trigger circuits in the manner described above. This is virtually the case when the $y$-conductors are scanned by an interlaced method (so that they may be considered as two groups of conductors) and the $x$-conductors are scanned in the manner described with reference to FIG. 4; moreover, all kinds of different combinations are possible. For example, the arrangement shown in FIG. 4 may be governed by the interlaced method, when the circuits R and Q associated with the $y$-conductors are divided into two groups of even-numbered and odd-numbered circuits those of the even-numbered group governing each other in order of succession as well as those of the odd-numbered group. The starting pulses also required in this case provide the change-over from even-numbered rasters to odd-numbered rasters and conversely.

With all these scanning system one or more of the groups of conductors may be controlled in the manner described above.

It will furthermore be obvious that also the negative terminal of the voltage source 8 may be connected to the cross-point scanning system. In this case the unilaterally conductive elements D, G and H are to be inverted, as well as the polarity of the governing pulses $V_L$, $V_p$ and $V_h$.

The said scanning system may furthermore be used for a radar panel. Such a panel comprises a great number of concentric conductors, on which two layers one of unilaterally conductive material and one of electro-luminescent material are provided. On top thereof are provided conductors, which are normal to the concentric conductors, so that they may be termed radial conductors. The concentric conductors may be connected to a device 5, of the kind shown in FIGS. 1, 2 and 3, to which the radar signals are fed. The radial conductors are connected to the trigger circuits and the control-devices and may be governed by pulses being in synchronism with the rotating aerial which captures the reflected radar signal.

What is claimed is:

1. A matrix cross-point scanning system having at least two groups of intercrossing conductors and switching means for switching the conductors of one of said groups, in a cyclic order of succession, from a first potential to a second potential and back to said first potential, said system comprising a plurality of bistable trigger circuits having first and second terminals, said trigger circuits each having a first stable state presenting a low impedance between said terminals and a second stable state presenting a high impedance between said terminals, a source of direct voltage having third and fourth terminals, means connecting said third terminal to said second terminals, separate resistor means connected between said fourth terminal and each of said first terminals, means connecting the conductors of said one group separately to the first terminal of at least some of said trigger circuits, a source of operating pulses, means responsive to said operating pulses for triggering said trigger circuits, whereby at least one trigger circuit is brought into said first stable state from said second stable state and at least another trigger circuit is brought into said second stable state from said first stable state in response to pulses from said source of operating pulses, and means for controlling the potential of the conductors of another of said groups of conductors.

2. A matrix cross-point scanning system having at least two groups of intercrossing conductors, and circuit means for switching the conductors of one of said groups, in a cyclic order of succession, from a first potential to a second potential, and back to said first potential, said circuit comprising a plurality of bistable trigger circuits having first and second terminals, said trigger circuits each having a first stable state presenting a low impedance between said terminals and a second stable state presenting a high impedance between said terminals, a source of direct voltage having third and fourth terminals, means connecting said third terminal to said second terminals, separate resistor means connected between said fourth terminal and each of said first terminals, means connecting the conductors of said one group to the first terminals of separate trigger circuits, a plurality of control devices, means connecting said control devices to the first terminals of separate trigger circuits, a common source of operating pulses connected to said control devices, said control devices being responsive to the potential at the respective first terminal and the occurrence of said operating pulses to change the respective trigger circuit and another trigger circuit to opposite stable states, and means for controlling the potential of the conductors of another of said groups of conductors.

3. The system of claim 2, in which said control devices comprise diode means connected to said source of operating pulses, whereby pulses are conducted only to one of said control devices at any given instant, dependent upon the potential at the first terminals of said trigger circuits.

4. The system of claim 2, in which the number of said trigger circuits is equal to the number of conductors in the group of conductors to be switched.

5. The system of claim 2, in which the number of said trigger circuits and control devices is double the number of conductors in the group of conductors to be switched, said conductors being connected to said first terminals of alternate trigger circuits, said source of operating pulses comprising means for providing undelayed pulses to alternate control devices and for providing delayed pulses to the remaining control devices, whereby the time said conductors remain in one of said stable states is determined by the delay of said delayed pulses.

6. The system of claim 2, in which said control devices are responsive to the potential at the respective first terminal and the occurrence of said operating pulse to change the respective trigger circuit and another trigger circuit, which is not the next successive trigger circuit, to opposite stable states.

7. The system of claim 2, comprising a second source of operating pulses in synchronization with said first-mentioned source of pulses, and means operatively controlled by said second source of pulses for changing the states of the last and first conductors of said group of conductors to be switched.

8. An electroluminescent display system of the type comprising a plurality of first parallel conductors extending in one direction and a plurality of second parallel conductors extending in a transverse direction, and wherein a luminescent display is dependent upon the potential existing between crossed conductors, said system comprising a source of video signals, means applying said video signals to said second parallel conductors whereby the information relating to a complete scanning line is simultaneously applied to said second conductors, and means for sequentially applying a first potential to said first conductors whereby a luminescent line display occurs at the junction of said second conductors and the first conductor to which said first potential is applied, said means for sequentially applying said first potential comprising a plurality of bistable trigger circuits having first and second terminals and exhibiting a first stable state with a low resistance between said terminals and a second stable state with a high resistance between said terminals, a source of direct voltage having third and fourth terminals, separate resistance means connecting said fourth terminals to said separate first terminals, means connecting said third terminal to said second terminals, means connecting said first conductors to separate first terminals, control device means connected to said trigger circuits, and a source of operating pulses connected to said control device means, said trigger circuits and control device means comprising means for sequentially applying said first potential to said first conductors.

9. An electroluminescent display system of the type comprising a plurality of first parallel conductors extending in one direction and a plurality of second parallel conductors extending in a transverse direction, and wherein a luminescent display is dependent upon the potential existing between crossed conductors, said system comprising a source of video signals, means applying said video signals to said second parallel conductors whereby the information relating to a complete scanning line is simultaneously applied to said second conductors, and means for sequentially applying a first potential to said first conductors whereby a luminescent line display occurs at the junction of said second conductors and the first conductor to which said first potential is applied, said means for sequentially applying said first potential comprising a plurality of bistable trigger circuits having first and second terminals and exhibiting a first stable state with a low resistance between said terminals and a second stable state with a high resistance between said terminals, a source of direct voltage having third and fourth terminals, separate resistance means connecting said fourth terminals to said separate first terminals, means connecting said third terminal to said second terminals, means connecting said first conductors to separate first terminals, a plurality of control devices, means connecting each control device to a separate first terminal, a source of operating pulses, and means applying said operating pulses to said control devices, said control devices being connected to change the state of the respective trigger circuit in one direction and to change the state of another trigger circuit in the opposite direction.

10. The system of claim 9, in which said operating pulses are line synchronization pulses, comprising a source of frame synchronization pulses, and control device means operatively connected to said source of frame synchronization pulses for changing the states of the trigger circuits connected to the two extreme first conductors in opposite directions.

References Cited in the file of this patent

UNITED STATES PATENTS

| | | |
|---|---|---|
| 2,774,813 | Livingston | Dec. 18, 1956 |
| 2,859,385 | Bentley | Nov. 4, 1958 |
| 2,892,968 | Kallmann et al. | June 30 1959 |